United States Patent
Watterson, II et al.

(10) Patent No.: US 8,474,876 B2
(45) Date of Patent: Jul. 2, 2013

(54) CAM STYLE ANTI-ROTATION KEY FOR TUBULAR CONNECTIONS

(75) Inventors: John J. Watterson, II, Houston, TX (US); Joseph W. Pallini, Jr., Tomball, TX (US)

(73) Assignee: Vetco Gray Inc., Houston, TX (US)

( * ) Notice: Subject to any disclaimer, the term of this patent is extended or adjusted under 35 U.S.C. 154(b) by 248 days.

(21) Appl. No.: 12/888,235

(22) Filed: Sep. 22, 2010

(65) Prior Publication Data

US 2011/0260445 A1   Oct. 27, 2011

Related U.S. Application Data

(60) Provisional application No. 61/326,940, filed on Apr. 22, 2010.

(51) Int. Cl.
*F16L 55/00* (2006.01)

(52) U.S. Cl.
USPC .............................................. 285/91; 285/39

(58) Field of Classification Search
USPC .................. 403/11, 118; 285/39, 91, 92, 392
See application file for complete search history.

(56) References Cited

U.S. PATENT DOCUMENTS

| | | | | |
|---|---|---|---|---|
| 1,849,339 A | * | 3/1932 | Vallendor | 285/36 |
| 2,234,957 A | * | 3/1941 | Boynton | 285/3 |
| 2,797,109 A | * | 6/1957 | Conrad | 285/81 |
| 3,702,707 A | * | 11/1972 | Rosan, Sr. | 285/23 |
| 4,902,047 A | | 2/1990 | Marietta et al. | |
| 6,478,344 B2 | | 11/2002 | Pallini, Jr. et al. | |
| 6,695,059 B2 | | 2/2004 | Thomas | |

FOREIGN PATENT DOCUMENTS

FR    2524112 A1    9/1983

OTHER PUBLICATIONS

Search Report from corresponding GB Application No. GB1106438.3 dated Jul. 27, 2011.
Search Report from corresponding GB Application No. GB1106438.3 dated Sep. 2, 2011.

* cited by examiner

*Primary Examiner* — Aaron Dunwoody
(74) *Attorney, Agent, or Firm* — Bracewell & Giuliani LLP

(57) ABSTRACT

An anti-rotation key inserts into a pocket formed on an outer surface of a male threaded connector. The key has a lower inner side portion for contact with the base of the pocket. An array of teeth on a lower outer side portion of the key bite into an inner wall of a female threaded connector as the key is forced into the pocket. One of the edges of the key is configured such that a line tangent to the first side edge where it intersects the lower outer side portion will intersect a line tangent to a central portion of the lower inner side portion at an angle less than 90 degrees. Relative motion between the male and female threaded connectors in a loosening direction causes the key to pivot about an engagement of the first side edge with the first side wall and bite more deeply into the inner wall of the female threaded connector.

25 Claims, 5 Drawing Sheets

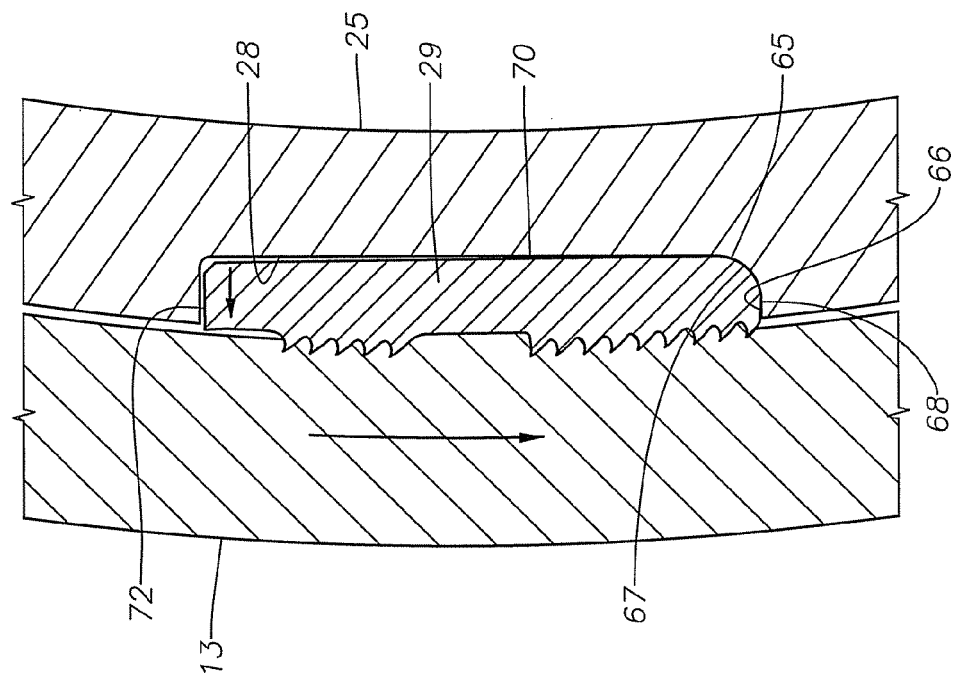
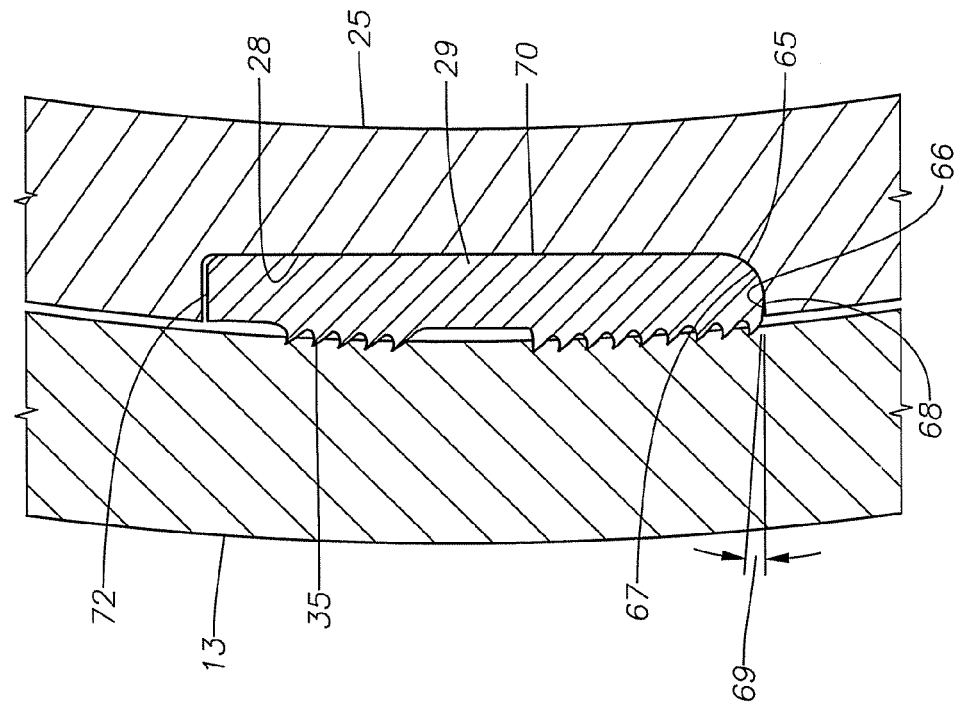

CAM STYLE ANTI-ROTATION KEY FOR TUBULAR CONNECTIONS

CROSS-REFERENCE TO RELATED APPLICATIONS

This application claims priority to provisional application 61/326,940 filed Apr. 22, 2010.

FIELD OF THE INVENTION

This invention relates in general to threaded tubular connections, such as for offshore oil well large diameter pipe, and particularly to a device to prevent rotation of the members after they are made up.

BACKGROUND OF THE INVENTION

Oil and gas wells normally have several strings of casing of differing diameters cemented in the well. Each casing string is made up of joints of pipe have threaded ends secured together. A typical casing joint has external threads on its upper and lower ends. A casing collar with internal threads secures the threaded ends together. In larger casing diameters, a casing collar with internal threads may be affixed, such as by welding, to one end of each pipe, the other end having external threads. Normally, the operator relies on the friction of the made-up joint preventing the threaded connectors from loosening while running the string into the well. With larger diameter casing, say from 18⅝ inch to 36 inch, the friction of the made-up connector may be inadequate to prevent loosening while running the casing.

In the past, operators have employed anti-rotation keys to prevent loosening. A rectangular pocket or slot is machined on the outer surface of the male connector. The female connector has an annular inner wall that surrounds the portion of the male connector containing the pocket. After making up the connector, the workers will drive a key into the pocket. The key has a slightly greater thickness than the distance from the base of the pocket to the inner wall, resulting in an interference fit. Normally, the workers drive the key into place with a hammer.

SUMMARY

The anti-rotation key of this invention inserts into a pocket formed on an outer surface of a male threaded connector. The pocket has a base and first and second side walls on opposite sides from and protruding outward from the base. The key has a lower inner side portion for contact with the base of the pocket. An array of teeth is located on a lower outer side portion for biting into an inner wall of a female threaded connector. The key has first and second side edges, each side edge joining the lower inner side portion with the lower outer side portion. The first side edge is configured such that a line tangent to the first side edge where it intersects the lower outer side portion will intersect the lower inner side portion at an angle less than 90 degrees. Relative motion between the male and female threaded connectors in a loosening direction causes the key to pivot about an engagement of the first side edge with the first side wall and bite more deeply into the inner wall of the female threaded connector. To facilitate the pivotal movement, the array of teeth may be spaced more closely to the first side edge than the second side edge.

Preferably, the first side edge has a first curved corner at the intersection between the first side edge and the lower inner side portion. The intersection between the second side edge and the lower inner side portion is asymmetrical with the first curved corner. The second side edge is configured such that a line tangent to the second side edge where it intersects the lower outer side portion will intersect the lower inner side portion at a right angle.

In one embodiment, the key has a threaded hole extending from the first side portion to the second side portion for receiving a set screw to bear against the base of the pocket. In another embodiment, a retainer having a lower end is attached to the lower outer side portion. A resilient upper end protrudes outward from the lower outer side portion for snapping against a shoulder within the inner wall of the female connector to retain the key in the pocket.

The key may have upward and downward-facing shoulders on an upper outer side portion. The shoulders are spaced apart from each other to define a key engaging profile. The shoulders may define a dove-tail profile. A connector profile may be formed on the female connector. A tool has a key engaging portion that releasably engages the key profile and a connector engaging portion that releasably engages the connector profile. The tool has a power mechanism that when energized moves the key engaging portion and the connector engaging portion closer toward each other to press the key into the pocket.

BRIEF DESCRIPTION OF THE DRAWINGS

FIG. 4 is a sectional view of the key and connector taken along the line 4-4 of FIG. 2.

FIG. 5 is a sectional view similar to FIG. 3, but illustrating in exaggeration the box connector rotated slightly in a loosening direction.

DETAILED DESCRIPTION OF THE INVENTION

Figure 1:
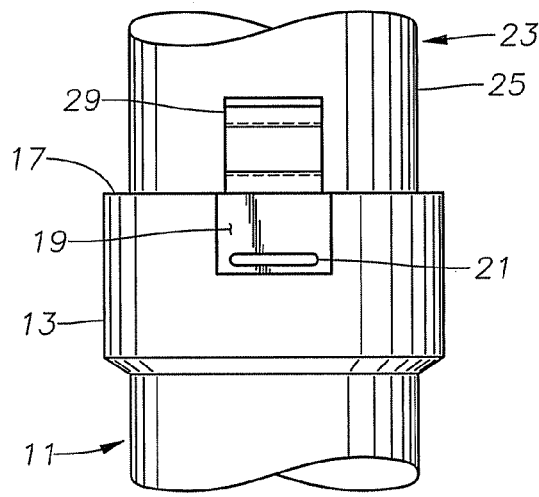
FIG. 1 is a side elevational view showing a connector between two pipes and having an anti-rotation key installed in accordance with this invention.
Figure 2:
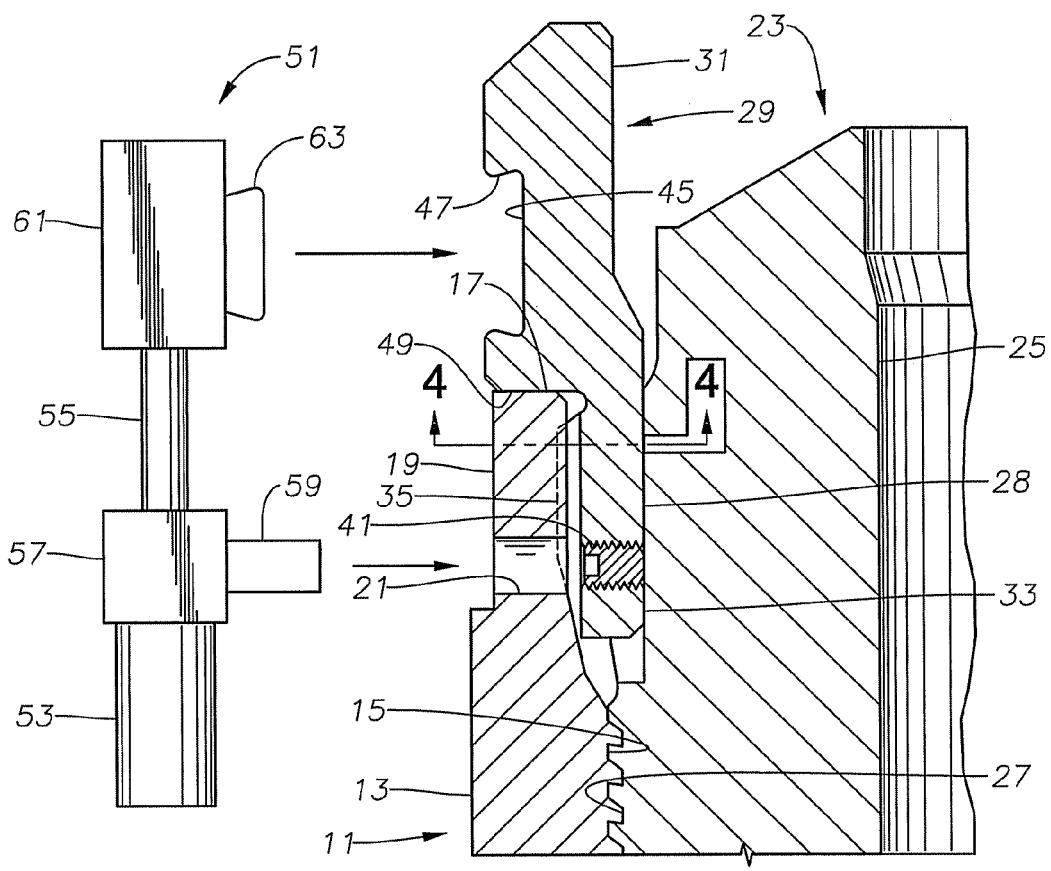
FIG. 2 is an enlarged sectional view of the anti-rotation key installed within the connector of FIG. 1, and also showing an installation tool for installing the key.

Referring to FIG. 1, a first pipe 11 has a box 13 on one end with internal threads 15 (FIG. 2). Box 13 is normally secured to first pipe 11 by welding, but it could be mounted to first pipe 11 in other manners. Box 13 has a rim 17 that is shown facing upward, but it could be oriented in other directions. In this embodiment, box 13 has a flat surface 19 formed on its exterior surface. Flat surface 19 joins rim 17. An elongated opening 21 extends through the sidewall of box 13 at flat surface 19. Opening 21 extends circumferentially a selected distance perpendicular to an axis of box 13. The ends of opening 21 are located near the side edges of flat surface 19.

A pin 25 is formed on the end of a second pipe 23. Pin 25 has a set of external threads 27 (FIG. 2) that engages threads 15. Pin 25 and box 13 are rotated relative to each other to make up threads 15 and 27. As shown in FIGS. 2, 4 and 5, pin 25 has a pocket 28 that is formed on its exterior. Pocket 28 is a generally rectangular slot with a flat outward facing surface or base. When pin 25 is secured to box 13, the lower outer side of pocket 28 is defined by an inner surface of box 13.

A key 29 is forced with an interference fit into pocket 28 in order to prevent loosening rotation of box 13 and pin 25 relative to each other. When key 29 is to be inserted, pin 25 will be rotated such that pocket 28 aligns with flat surface 19. Preferably, threads 15, 27 are formed so that pin 25 will be fully made up with box 13 when flat surface 19 is generally aligned with pocket 28. As shown in FIG. 2, key 29 has an upper portion 31 and a lower portion 33, with lower portion 33 fitting with an interference fit between pocket 28 and the lower inner sidewall portion of box 13 opposite flat surface 19. The radial thickness of lower portion 33 is greater than the radial distance between the base of pocket 28 and the lower inner sidewall portion of box 13. Key 29 has a plurality of teeth 35, which are elongated and parallel to an axis of pin 25 once installed. Teeth 35 have sharp crests for imbedding into box 13. Key 29 may be formed of a metal harder than box 13. A set screw 41 may be employed to secure key 29 to prevent it from working loose. Set screw 41 is accessed by a tool inserted through elongated opening 21. Set screw 41 is tightened to frictionally engage the base of pocket 28.

Referring still to FIG. 2, key 29 has a key profile defined by a recess 45 extending across the outer surface of key 29. Recess 45 has upper and lower shoulders 47 that may be dovetailed, as illustrated, so that the base of recess 45 has a greater axial length than the entrance to recess 45. With this configuration, the upper and lower shoulders 47 of recess 45 are at angles less than 90 degrees relative to the base of recess 45. The upper shoulder 47 extends outward and downward from the base of recess 45, and the lower shoulder extends outward and upward from the base of recess 45. The upper and lower edges of the base of recess 45 are in planes perpendicular to the axis of pin 25 when key 29 is installed in pocket 28. Key 29 also has a stop shoulder 49 that faces downward for abutting rim 17 of box 13 when fully installed.

Figure 3:
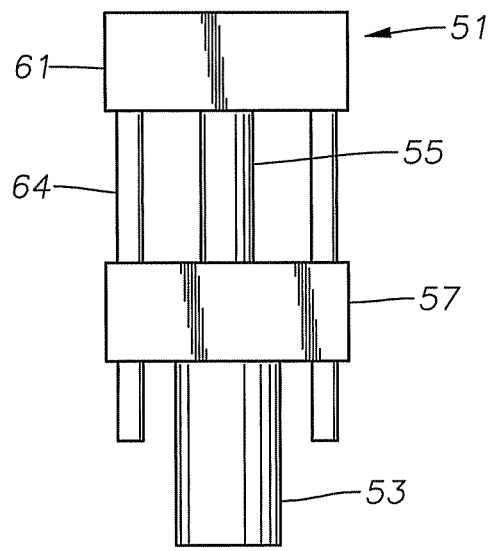
FIG. 3 is a rear view of the installation tool of FIG. 2.

An installation tool 51 is illustrated as being aligned for engagement with key 29 and box 13. Installation tool 51 in this example has a hydraulic cylinder 53 with a piston shaft 55. A base member 57 mounts stationarily to hydraulic cylinder 53. Base member 57 has a blade 59 that is sized for inserting into elongated opening 21, which also serves as a connector profile. A head 61 is located on the opposite end of shaft 55. Head 61 includes an engagement member 63 that is generally dovetail shaped for engaging recess 45. The axial dimension of engagement member 63 is preferably less than the axial extent of recess 47, such as about two-thirds the length, so that it can be readily inserted into recess 45. When tool 51 is placed in engagement with box 13 and key 29, engagement member 63 enters recess 45, and blade 59 will enter elongated opening 21. Applying hydraulic fluid pressure will cause head 61 to move downward or toward base 57, forcing key 29 into pocket 28. As shown in FIG. 3, installation tool 51 may have guide rods 64 on opposite sides of shaft 55 for maintaining alignment of shaft 55. Applying hydraulic fluid pressure in a reverse direction will withdraw key 29 from pocket 28, if desired.

Figure 4A:
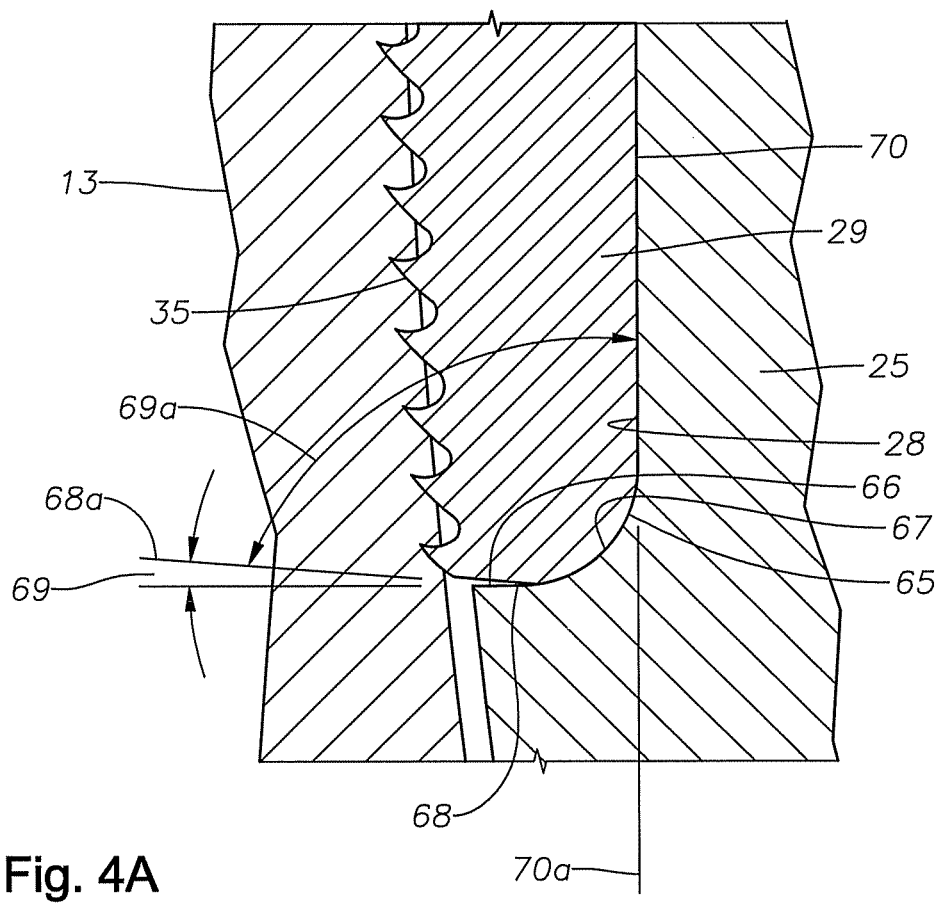
FIG. 4A is an enlarged sectional view of a lower portion of the key as shown in FIG. 4.

Referring to FIGS. 4 and 4A, a first side edge of key 29 is preferably formed such that it has an external curved corner 65 at its intersection with the flat back surface 70 of key 29. The radius of curved corner 65 is quite large. Pocket 28 has a first side edge 66 that is perpendicular to the flat base of pocket 28, defining an internal corner 67 formed in pocket 28. Corner 67 may be a conventional 90 degree intersection between two flat surfaces perpendicular to each other. Alternately corner 67 could have a mating radius to key curved corner 65.

Key curved corner 65 joins a side edge 68 of key 29 that extends to the outer side of key 29, which contains teeth 35. In this example, side edge 68 is straight, but it is not perpendicular to the back surface 70 of key 29 or the base of pocket 28, which is preferably flat. In this example, back surface 70 is flat and flush with the base of pocket 38, except where curved corner 65 begins. Side edge 68 could be curved rather than straight, being an extension of curved corner 65 but at a lesser rate of curvature. A line 68a tangent to side edge 68 where it intersects the outer side of key 29 will intersect a line 70a tangent to the central portion of key back surface 70 at an angle 69a less than 90 degrees. Stated another way, first side edge 68, which may be referred to as a cam edge, is at an angle 69a less than 90° relative to key back surface 70. An angle 69 of a few degrees exists between a line perpendicular to key back surface 70 and cam edge 68. The side edge 66 of pocket 28, on the other hand, is flat and perpendicular to the flat base of pocket 28 in this example, thus angle 69 is also a measure of the angular clearance between key cam edge 68 and the pocket side edge 66 when key 29 is initially installed in pocket 28.

In the preferred embodiment, cam side edge 68 is located only on one side edge of key 29; the other or second side edge 72 optionally may be conventional and perpendicular to key back surface 70. There may be a small conventional fillet between second side edge 72 and key back surface 70. If so, the fillet would have a much smaller radius than curved corner 65 on cam side edge 68 of key 29. The side edges 68, 72 of key 29 thus may be asymmetrical. Considering the direction of rotation of box 13, which is indicated by an arrow in FIG. 5, if box 13 is being unscrewed from pin 25 while key 29 is in place, cam side edge 68 leads side edge 72 of key 29.

As shown in FIG. 4, teeth 35 may be located in an array of two groups separated by a central section free of teeth. The first side edge of the array of teeth 35 begins at cam side edge 68 without any gap. In this example, the second side edge of the array of teeth 35 is spaced a considerable distance from key second side edge 72, leaving a large gap free of teeth joining second side edge 72.

FIG. 5 illustrates that when box 13 tends to rotate relative to pin 25 in an unscrewing direction, the rotation will cause key 29 to pivot or rotate slightly about radius corner 65, which serves as a pivot point. Cam side edge 68 is spaced from pocket side edge 66 by angle 69, thus allowing this rotation. The rotation causes a portion of key back surface 70 to separate from contact with the base of pocket 28. The rotation allows teeth 35 to remain embedded or become more deeply embedded in the inner surface of box 13, limiting the amount of rotation if box 13. Angle 69 reduces and may become zero with cam edge 68 abutting and parallel to pocket side edge 66.

Figure 7:
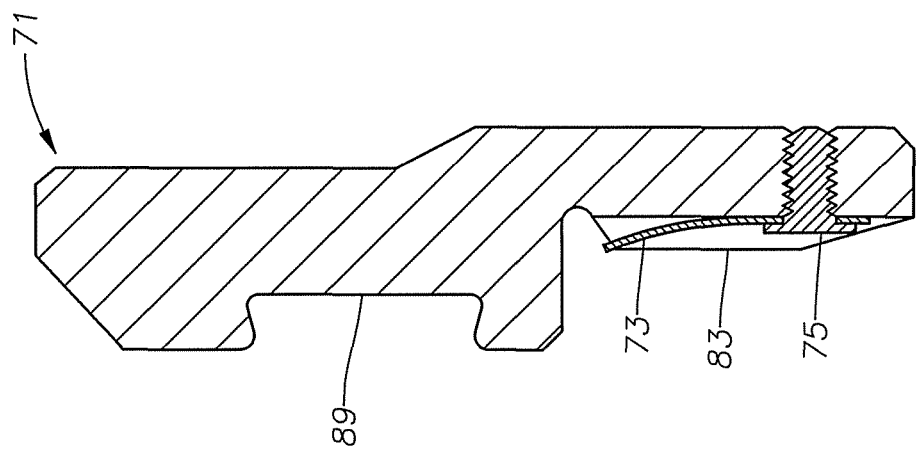
FIG. 7 is a sectional view of the anti-rotation key of FIG. 6.
Figure 6:
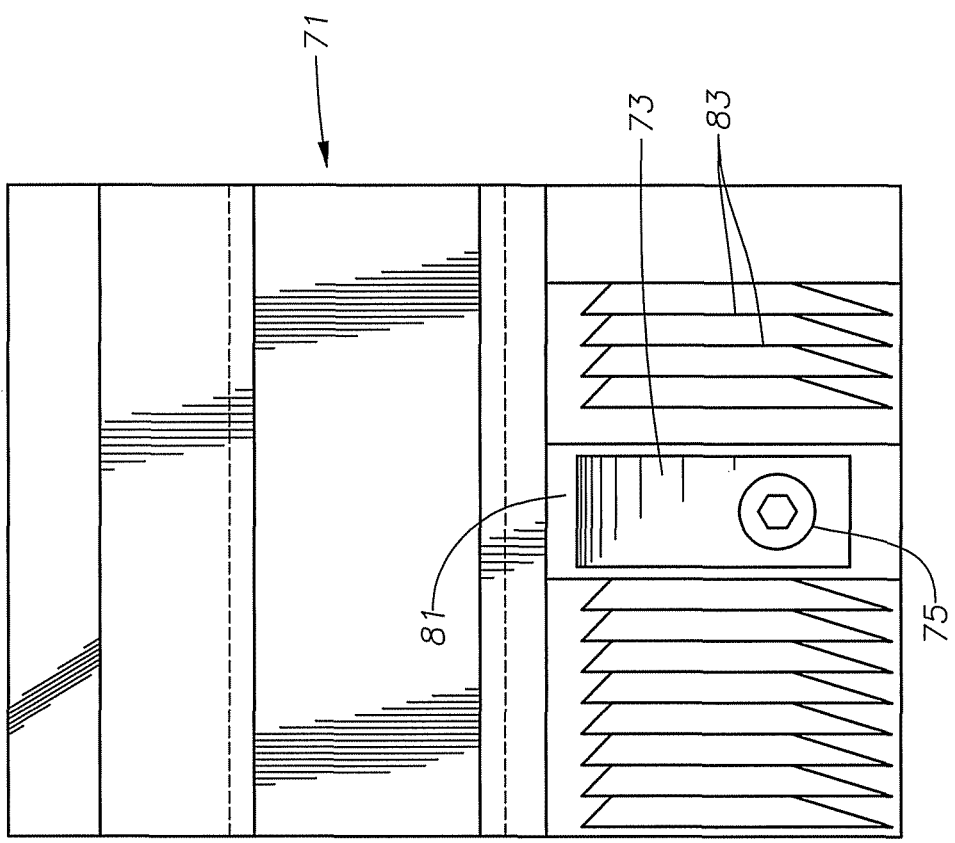
FIG. 6 is a view of a lower inner side of an alternate embodiment of an anti-rotation key.
Figure 8:
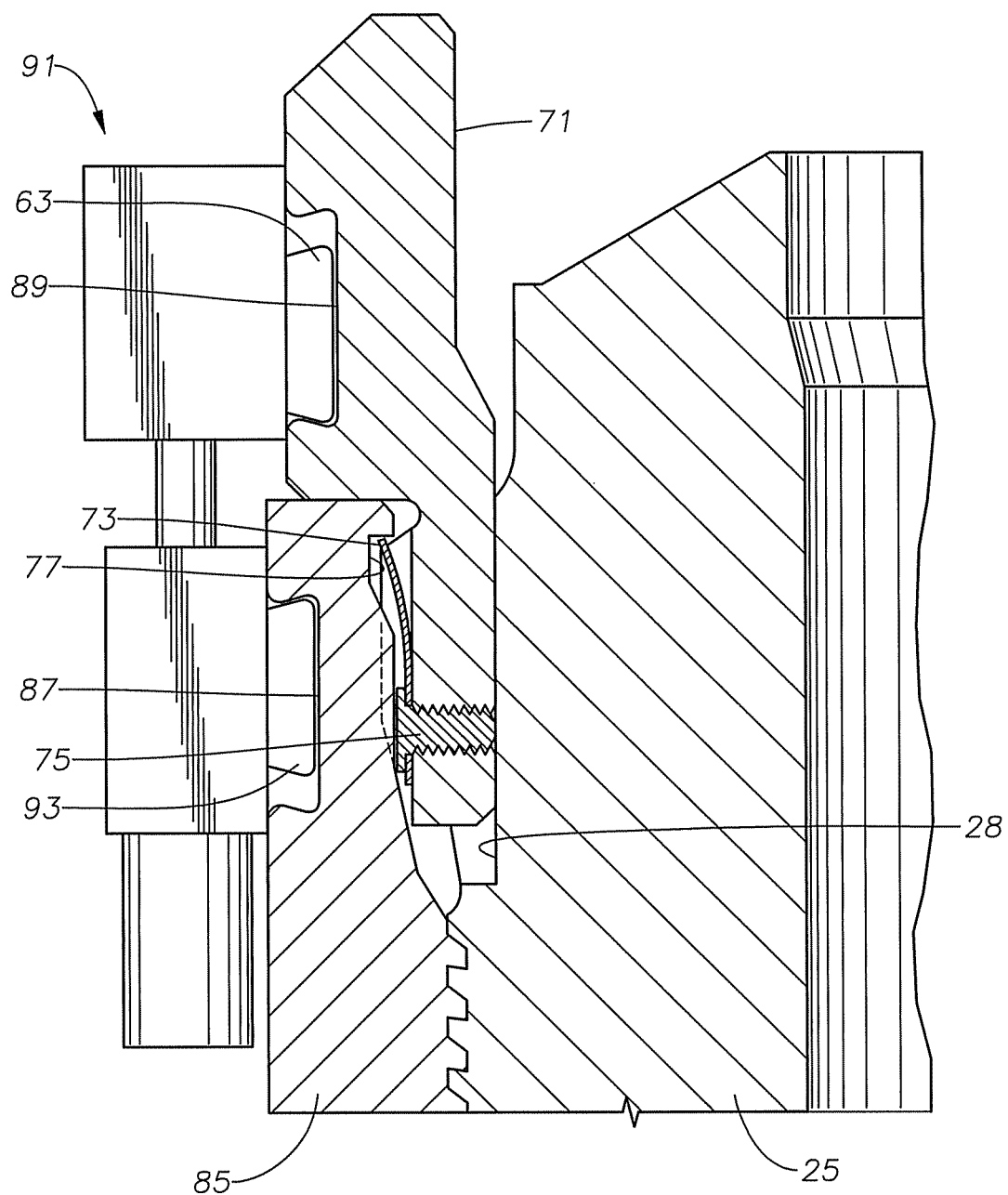
FIG. 8 is a sectional view of the anti-rotation key of FIG. 6 installed within a pipe connector.

FIGS. 6-8 illustrate an alternate embodiment. The components that are the same will not be mentioned attain. Rather than a se screw to retain the key, in this embodiment a lock or retainer spring 73 may be employed to prevent key 71 from working itself out of pocket 28. In this example, lock spring 73 is a flat metal spring with a lower portion secured by a fastener 75 to key lower portion 33. The upper portion of lock spring 73 is resilient and biased outward to snap info an annular groove 77 extending around the inner circumference of box 85, When key 71 is forced downward into pocket 28, the upper and free end of lock spring 73 will snap out into engagement with groove 77. If key 71 starts to move upward, the upper end of spring 73 will abut a downward facing shoulder in annular groove 77, preventing further movement.

As shown in FIG. 6, lock spring 73 may be located in a central portion 81 between the two side edges of key 71. In this example, central portion 81 is a flat space located between two separate sets of teeth 83. FIG. 7 illustrates key 71 before installation into pocket 28. Spring 73 is shown in its natural condition prior to engaging annular groove 77. In order to disconnect box 85 from pin 25, a hole (not shown) may extend axially downward through key 71. A tool can be inserted through the hole to depress spring 73 out of groove 77, allowing key 71 to be withdrawn from pocket 28.

Also, in the embodiment of FIGS. 6-8, there is no flat surface formed on the outer surface of box 85. Rather, the entire outer surface may remain cylindrical, allowing box 85 to be made up with pin 25 and key 71 inserted without orienting the box 85 and pin 25 relative to each other. Box 85 has an annular recess profile 87 that has the same or similar dimensions to recess profile 89 in key 71. In this example, there is no elongated hole within box 87 similar to hole 21 (FIG. 1).

Installation tool 91 is similar to installation tool 51, except that rather than a blade such as blade 59 it has an engagement member 93. Engagement member 93 is dimensioned for engaging the dovetail recess 87 formed in box 85. An upper engagement member 63 engages recess profile 89 within key 71. The axial lengths of engagement members 93 and 63 are less than the axial lengths of recess profiles 87 and 89. FIG. 8 illustrates the position of tool 91 just after fully inserting key 71.

Tool 51 (FIG. 1) and tool 91 (FIG. 8) could differ from what is shown. Rather than blade 59 and hole 21 in FIG. 2, the reacting or lower portion of tool 51 could engage a lower shoulder on the casing collar to force key 29 in. For withdrawing key 29, the reacting portion of the tool could bear against rim 17. Engaging member 93 and slot 87 in tool 91 could be eliminated, with the reactive portion of tool 91 engaging a lower shoulder on the casing collar in a similar manner to insert key 71. For withdrawing key 71, the reactive lower portion of tool 91 could bear against a portion of the rim of casing collar 85.

While the anti-rotation system has been shown in only a few of its forms, it should be apparent to those skilled in the art that it is not so limited, but is susceptible to various changes.

The invention claimed is:

1. A threaded connection between tubular members, comprising:
    a male threaded connector having external threads for engaging internal threads of a female threaded connector;
    a pocket formed on an outer surface of the male threaded connector, the pocket having a base and first and second side walls on opposite sides from and protruding outward from the base;
    a key having a lower inner side portion in contact with the base of the pocket;
    an array of teeth on a lower other side portion for biting into an inner wall of the female threaded connector;
    first and second side edges, each side edge joining the lower inner side portion with the lower outer side portion, the first side edge being adjacent to the first side wall of the pocket, the second side edge being adjacent the second side wall of the pocket, the first side edge having a curved corner at an intersection between the first side edge and the lower inner side portion, defining a pivot point such that relative motion between the male and female threaded connectors in a loosening direction causes the key to pivot about an engagement of the curved corner with the first side wall and bite more deeply into the inner wall of the female threaded connector; and
    wherein the intersection between the second side edge and the lower inner side portion is asymmetrical with the curved corner.

2. The threaded connection according to claim 1, wherein the second side edge is configured such that a line tangent to the second side edge where it intersects the lower outer side portion will intersect the lower inner side portion at a right angle.

3. The threaded connection according to claim 1, further comprising is threaded hole extending from the lower outer side portion to the lower inner side portion for receiving a set screw to bear against the base of the pocket.

4. The threaded connection according to claim 1 further comprising:
    is retainer having a lower end attached to the lower outer side portion and a resilient upper end protruding outward from the lower outer side portion for snapping against a shoulder within the inner wall of the female connector to retain the key in the pocket.

5. An anti-rotation key for insertion in a pocket formed on an outer surface of a male threaded connector, the pocket having a base and first and second side walls on opposite sides from and protruding outward from the base, the key comprising:
    a lower inner side portion for contact with the base of he pocket:
    an array of teeth on a lower outer side portion for biting into an inner wall of a female threaded connector;
    first and second side edges, each side edge joining the lower inner side portion with the lower outer side portion, the first side edge defining a pivot point such that relative motion between the male and female threaded connectors in a loosening direction causes the key to pivot about an engagement of the first side edge with the first side wall and bite more deeply into the inner wall of the female threaded connecter; and
    upward and downward-facing shoulders on an upper outer side portion, the shoulders being spaced apart from each other for receiving an engagement member of an installation tool to apply upward and downward forces to the key.

6. The threaded connection according to claim 1, wherein the first side edge is configured such that a line tangent to the first side edge where it intersects the lower outer side portion will intersect a line tangent to a central portion of the lower inner side portion at an angle less than 90 degrees.

7. The threaded connection according to claim 1, wherein the array of teeth is spaced more closely to the first side edge than the second side edge.

8. A threaded connection between tubular members, comprising:
    female connector having internal threads, a rim, and an inner wall extending from the internal threads to the rim;
    a male connector having external threads that engage the internal threads of the female connector;
    a pocket formed on an outer surface of the male connector, the pocket having an outward-facing base and side walls on opposite sides of and protruding outward from the base;
    an anti-rotation key having a lower inner side portion for contact with the base of the pocket;
    an array of teeth on an lower outer side portion of the key for biting into the inner wall of the female connector when the key is installed in the pocket;
    first and second side edges on the key, each side edge joining the lower inner side portion with the lower outer side portion, the first side edge being configured to be at an angle relative to first side wall of the pocket upon initial installation, so that relative motion between the male and female connectors in a loosening direction causes the key to pivot about an engagement of the first side edge with the first side wall and bite more deeply into the inner wall of the female threaded connector;

a first curved corner at an intersection between the first side edge and the lower inner side portion of the key; and wherein the intersection between the base and first side edge of the pocket lacks a curved corner with a radius the same as the first curved corner.

9. The threaded connection according to claim 8, wherein:
the base of the pocket and a central portion of the lower inner side portion of the key are flat and in flush contact with each other when the key is initially installed; and
the first side wall of the pocket is flat and perpendicular to the base.

10. The threaded connection according to claim 8, wherein the central portion of the lower inner side portion of the key is flat, and the second side edge is located in a plane that is perpendicular to the central portion of the lower inner side portion.

11. The threaded connection according to claim 8, further comprising:
a threaded hole extending from the lower outer side portion to the lower inner side portion; and
a set screw that extends through the threaded hole and bears against the base of the pocket.

12. The threaded connection according to claim 8, further comprising:
a downward facing shoulder on the inner wall of the female connector; and
to resilient retainer having to lower end attached to the lower outer side portion and an upper end protruding outward from the lower outer side portion into engagement with the shoulder on the inner wall of the female connector.

13. the threaded connection according to claim 8, further comprising:
upward and downward-facing shoulders on an upper outer side portion of the key, the shoulders being spaced apart from each other for receiving an engagement member of an installation tool to apply upward and downward forces to the key.

14. The threaded connection according to claim 13, wherein the shoulders and the upper outer side portion between the shoulders define a dove-tail configuration.

15. the threaded connection according to claim 8, wherein the array of teeth is spaced more closely to the first side edge than the second side edge.

16. The threaded connection according to claim 8, wherein the first side edge of the key is asymmetrical relative to the second side edge of the key.

17. The threaded connection according to claim 8, further comprising:
a threaded hole extending from the lower outer side portion to the lower inner side portion;
a set screw that extends through the threaded hole and bears against the base of the pocket; and
a circumferentially elongated hole extending through the female connector at the inner wall for inserting a tool to rotate the set screw.

18. A method of preventing female and male connectors from unscrewing, comprising:
forming a pocket formed on an outer surface of the male connector, the pocket having an outward-facing base and first and second side walls on opposite sides of and protruding outward from the base;
providing an anti-rotation key having a lower inner side portion, a lower outer side portion with an array of teeth, and first and second side edges on the key, each side edge joining the lower inner side portion with the lower outer side portion, curved corner at the intersection between the first side edge and the lower inner side portion, defining a pivot point, and wherein the intersection between the second side edge and the lower inner side portion is asymmetrical with the curved corner;
forcing the key into the pocket, easing the teeth to bite into an inner wall of the female connector, the first side edge of the key being formed such that an angular clearance exists between the first side edge of the key and the first side wall of the pocket upon initial installation; and,
in the event loosening movement begins to occur, causing the key to pivot about an engagement of the curved corner with the first side wall and bite more deeply into the inner wall of the female threaded connector.

19. The method according to claim 18, wherein the first side edge is formed such that a line tangent to the first side edge where it intersects the lower outer side portion will intersect a line tangent to a central portion of the lower inner side portion at an angle less than 90 degrees.

20. The method according to claim 18, wherein:
when initially installed, the lower inner side portion of the key is in parallel to and flush contact with the base of the pocket; and
after the key pivots, the lower inner side portion of the key will be misaligned with the base.

21. An apparatus for preventing loosening engagement between is threaded female connector and a threaded male connector, the male connector having a pocket formed on an outer surface thereof, the apparatus comprising:
an anti-rotation key having a lower portion for insertion into the pocket and into engagement with an inner wall of the female connector;
a key profile formed on an upper portion of the key;
a connector profile formed on the female connector;
a tool having a key engaging portion that releasably engages the key profile and a connector engaging portion that releasably engages the connector profile; and
the tool having a power mechanism that when energized moves the key engaging portion and the connector engaging portions closer toward each other to press the key into the pocket.

22. The apparatus according to claim 21, wherein the key profile comprises a slot formed on an outward facing part of the upper portion of the key.

23. The apparatus according to claim 21, wherein the connector profile comprises a hole formed in the female connector.

24. The apparatus according to claim 21, wherein the connector profile comprises a slot.

25. A method for inserting an anti-rotation key into a pocket between a threaded female connector and a threaded male connector, the method comprising:
providing a key profile on an upper portion of the key;
forming a connector profile on the female connector;
providing a tool having a key engaging portion, a connector engaging portion and a power mechanism to cause the key engaging portion and connector engaging portions to move toward each other;
inserting the key engaging portion into the key profile and the connector engaging portion into the connector profile; and energizing the power mechanism to move the key engaging portion toward the connector engaging portion, thereby pressing the key into the pocket.

\* \* \* \* \*